C. A. HUMPHREYS.
LOSS OF HEAD GAGE.
APPLICATION FILED JUNE 19, 1918.

1,338,504.

Patented Apr. 27, 1920.
2 SHEETS—SHEET 2.

INVENTOR

UNITED STATES PATENT OFFICE.

CHARLES A. HUMPHREYS, OF BLUEFIELD, WEST VIRGINIA, ASSIGNOR TO PITTSBURGH FILTER MANUFACTURING COMPANY, OF PITTSBURGH, PENNSYLVANIA, A CORPORATION OF PENNSYLVANIA.

LOSS-OF-HEAD GAGE.

1,338,504.   Specification of Letters Patent.   Patented Apr. 27, 1920.

Application filed June 19, 1918. Serial No. 240,872.

*To all whom it may concern:*

Be it known that I, CHARLES A. HUMPHREYS, a citizen of the United States, and resident of Bluefield, in the county of Mercer and State of West Virginia, have invented a new and useful Improvement in Loss-of-Head Gages; and I do hereby declare the following to be a full, clear, and exact description thereof.

My invention relates to an improved form of gage which is adapted to be used for measuring loss of head of liquids, and it may be employed in conjunction with filters—such as sand or gravity filters for measuring both loss of positive and negative head.

The invention is designed not only to provide means whereby the height of the water above the filter-bed or the condition of flow of the water from beneath the filter-bed may be ascertained at a glance by reading the appropriate indicators, but also whereby the difference in positive and negative head may be instantly observed; and finally, the invention contemplates recording means by which variations either in positive head or negative head may be permanently recorded so that the conditions of head for any given period of time—for example, during the night—may be ascertained by an inspector at the filter plant at any required time.

This form of gage also has the further advantage that by it the permanent record is also made of the time when and during which a filter has been washed, as will appear from the further description.

While the invention will be described particularly with respect to its application to a filter plant, it will be understood that it may be used in a number of other relations, and may, indeed, be used to record variations in level of liquid in different tanks, including the relation of such variations one to the other.

Figure 1:
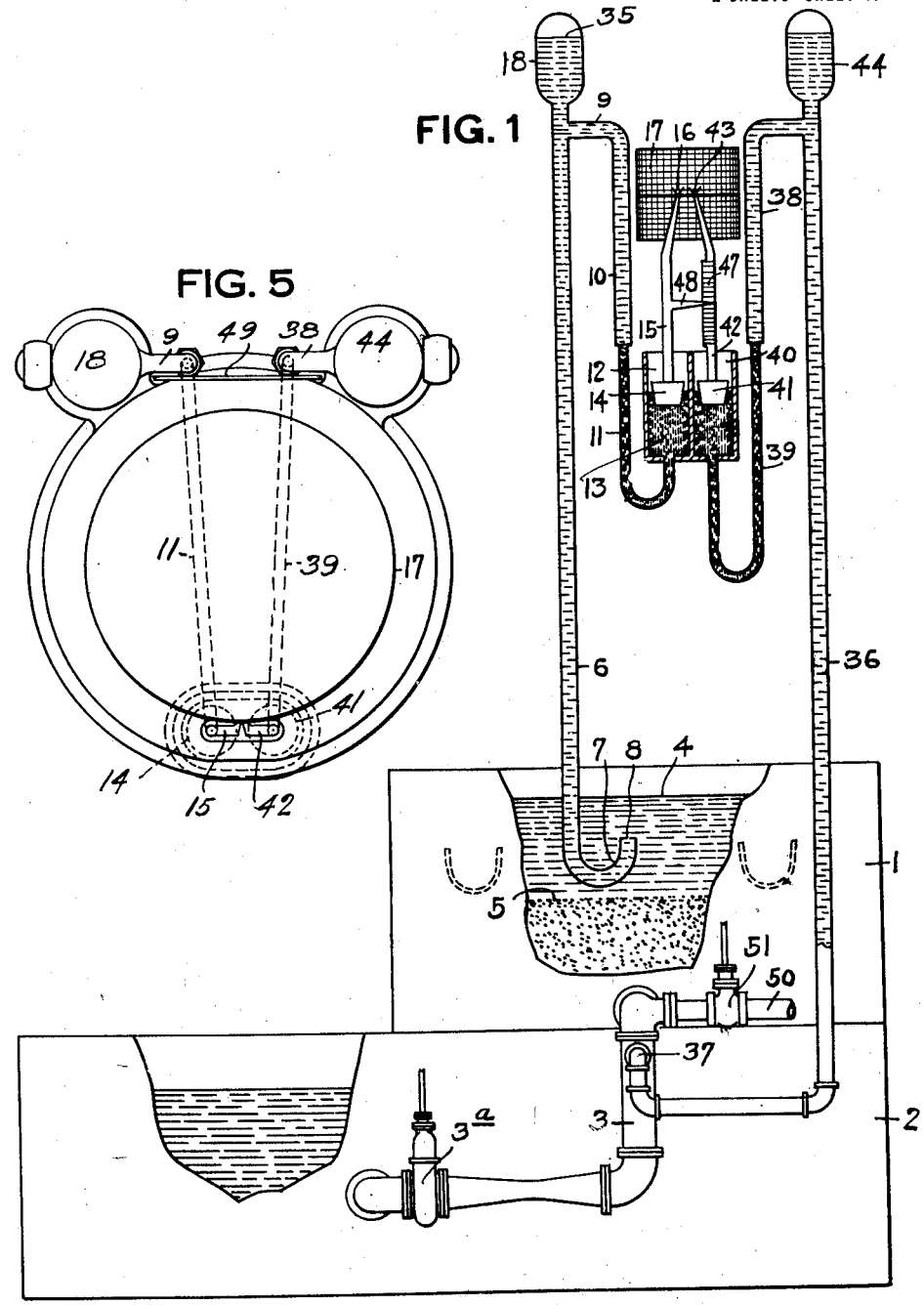
Figure 2:
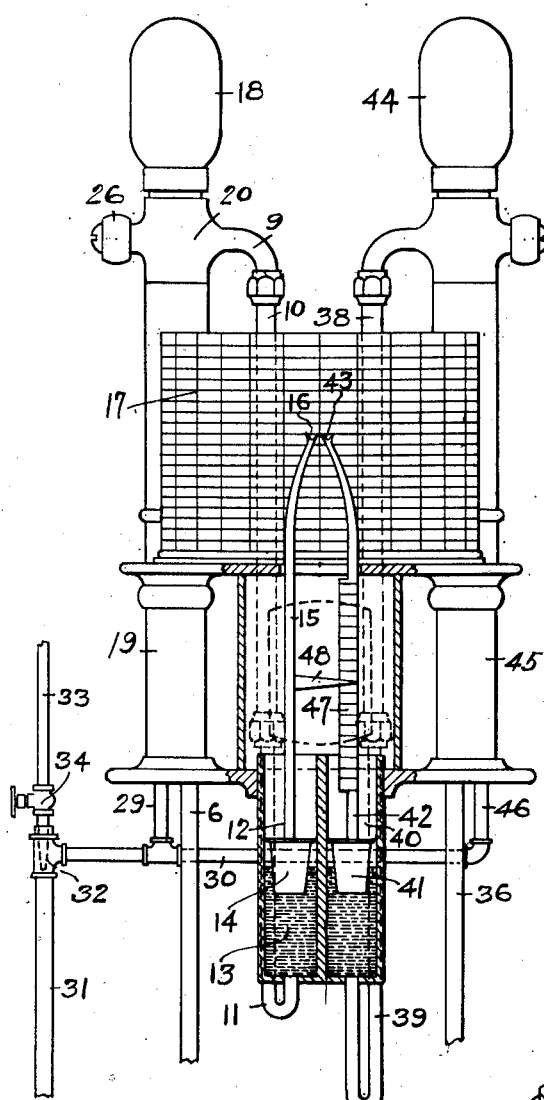
Figure 3:
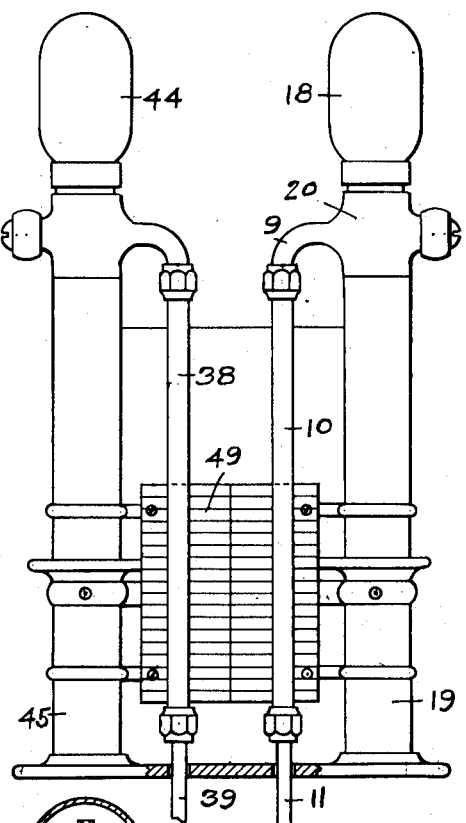
Figure 4:
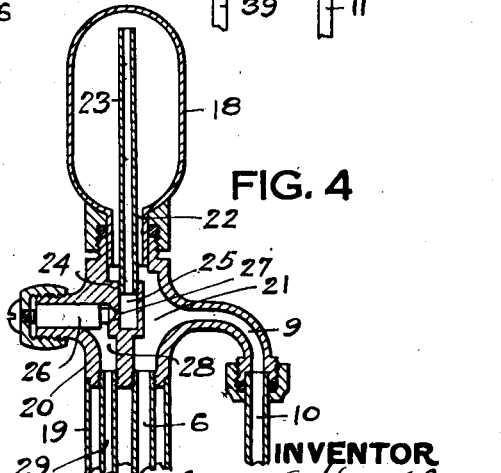

With these and other objects in view, the invention consists in a construction and arrangement of parts, a preferred embodiment of which is illustrated in the accompanying drawings, in which Figure 1 is a diagrammatic view in elevation showing the invention applied to a filter; Fig. 2 is a front elevation of the recording mechanism parts being in section for clearer illustration; Fig. 3 is a rear elevation of the parts shown in Fig. 2; Fig. 4 is a fragmentary vertical section of part of the apparatus illustrated in Figs. 2 and 3; and Fig. 5 is a top plan view of the apparatus.

In the embodiment of the invention herein selected for illustration, 1 indicates the filter tank of an ordinary sand filter of any desired construction; 2 indicates a clear-water reservoir beneath the filter-bed; 3 indicates the discharge pipe leading from beneath the filter-bed or tank to the clear-water reservoir 2. Within the filter-tank, the level of the liquid or water is indicated at 4. The surface of the sand of the filter-bed is indicated at 5. The indicating and recording mechanism for the positive head or height of the water in the filter-tank above the sand-bed 5 comprises a pipe 6 whose lower end is bent upward at 7 to form a liquid seal or trap in the pipe, and it is obvious that this pipe is adapted to communicate pressure variations due to the level of the water surface 4 to the open end 8 of this pipe. Communicating with the upper end of the pipe 6 is a branch-pipe 9, which has a downward reach 10 communicating with the gage-tube 11, which in turn communicates with a float-chamber 12. The float-chamber 12 and the gage portion 11 of the pipe 10 are filled to a large extent with mercury 13, and within the float-chamber 12 is a float 14 having an indicating rod 15 terminating in a stylus 16. Adjacent the stylus 16 is a circular drum having stretched thereover a record-sheet 17, which is properly marked by vertical lines to indicate intervals of time—such as hours, half hours, etc.—and is marked horizontally to indicate different heights of the liquid in the filter-tank 1 above the filter-bed.

The upper part of the pipe 6 above the junction of the pipe 9 is provided with a vacuum chamber 18. Referring now to Fig. 4, the details of this vacuum-chamber and its connections are clearly indicated. The vacuum-chamber 18 and the pipe 6 which communicates with the filter-chamber are mounted on a suitable pillar or standard 19. This standard has at its upper end a fixture 20 providing a chamber 21 communicating with the pipe 6 and communicating also, through a passage 22, with the interior of the vacuum-chamber 18. Through this passage 22 extends a vacuum-pipe 23, which is mounted at 24 on the fitting 20 where the fitting is provided with a valve-chamber 25 controlled by a valve 26, which valve 26 is adapted to open or close the passage 27 in the chamber 25 to a passage 28, which communicates with an extension 29 of the vacuum-pipe, said extension communicating with any suitable source of vacuum. For example, as shown in Figs. 2 and 3, the extension 29 of the vacuum-pipe is coupled to a pipe 30, which, in turn, is coupled to a pipe 31 provided with a nozzle 32 at the lower end of the pressure-pipe 33, whereby vacuum may be produced in the system of pipes 29 and 30 in a well-known manner. The pressure-pipe 33 may be controlled, if desired, by a valve 34 to regulate or cut off the vacuum-producing action.

It will be obvious from the above-described construction when suction is exerted in the chamber 18 through the pipe 23 and its connections with the vacuum apparatus, water will be drawn up from the mass of water above the filter-bed in the filter-tank 1, through the pipe 6, and into the vacuum-chamber 18 at the top of the column, and the water will also flow through the junction 9 into the pipe 10. When the pipes 6 and 10 and the vacuum-chamber 18 are filled with water to the required level—as for example, 35, Fig. 1—and, in any event, to some point above the junction of the pipe 10 with the pipe 6, it will be seen that the pipe 6 is filled with a column and the pipe 10 is also completely filled above the level of the mercury 13 in the gage portion 11 of said pipe.

In this condition of the apparatus, any variations in the head or height of the water in the filter-tank 1 above the open end 8 of the pipe 6 will vary the pressure exerted through the water column in the pipes 6 and 10 upon the surface of the mercury in the tube 11, consequently, variations in level 35 and in the height of the mercury in the float-chamber 13 will result, thus lowering or raising the float 14, its recording-arm 15 and the stylus 16.

The record-cylinder upon which the record-sheet 17 is mounted, may be provided with any suitable form of clock-work mechanism to cause it to revolve a given distance in a given period of time—say, for example, the distance between two of the vertical lines on the record-sheet for every hour or half hour, or other interval of time. Consequently, the stylus 16 will trace a line upon the record-sheet, variations in height of which will instantly show the varying conditions of positive head in the filter-tank above the filter-bed 5 at every instant throughout the period of operation.

Referring now to the mechanism for measuring variations in the negative head or conditions of flow in the outlet pipe 3 from beneath the filter-bed 1 and discharging the filtered liquid to the clear-water reservoir 2, a pipe 36 is provided communicating with the outlet-pipe 3 at the point 37. This upwardly-extending pipe 36 communicates with a gage-pipe 38 having the gage-portion 39 communicating with a second float-chamber 40. In the float-chamber 40 is mounted a float 41 having an indicator-arm 42 terminating in a stylus 43, which is also positioned to trace a record on the record-sheet 17. At the upper end of the pipe 36 is a second vacuum-chamber 44, which may be in all respects of the same construction and arrangement and similar in its connections to the vacuum-chamber 18 of the pipe 6.

Referring to Fig. 2, it will be seen that the pipe 36 passes up through the column or standard 45, and up through said column 45 also extends a vacuum-pipe or connection 46, which is coupled to the common vacuum-pipe 30.

As in the case of the recording apparatus for the positive head or level of the water above the filter-bed, water is drawn up through the pipe 36 and into the vacuum-chamber 44, and also flows into the pipe 38 until the column in this pipe rests upon the surface of the mercury in the gage-portion 39 of this pipe. Consequently, differences in flow of the clear water from beneath the filter-bed 4 in the filter-tank 1 out through the outlet-pipe 3 will be accurately gaged and indicated by the stylus 43 on the record-sheet 17. It will be noted, moreover, that the recording of variations in this negative head, or head of the liquid flowing from beneath the filter-bed, is effected independently of the recording operation of the stylus 16 of the positive head. Each stylus, therefore, traces its independent record on the recording-sheet 17 and by using recording inks of different colors with each stylus a permanent record both of positive head and of negative head and variations in each will be recorded on the record-sheet 17.

While it has been stated that these records of positive head and negative head, respectively, are independently produced, it will be clear from a moment's consideration of the conditions in a filtering plant or tank that the conditions of positive head and negative head in the filter are somewhat dependent one upon the other. For example, the negative head will be in large degree influenced by the height of the water above the filter-bed, or the positive head. But another element enters into the calculation as effecting the conditions, and that is, the kind and thickness of the film or coating which forms on the surface of the sand-bed of the filter as the filtering process continues. This coating may become so dense or thick that the positive head or height of water above the filtering surface has less and less effect on the flow of water from beneath the filter-bed, until a point is reached at which the filter ceases to function effectively. At this point, it is necessary to wash the filter; that is to say, stir up the material of the filter-bed in such manner as to break up this film or coating and dispose of it so that the filter-bed will again be restored to proper filtering condition.

The differences between the positive head and negative head as recorded on the recording mechanism, therefore, will quickly apprise the observer or inspector not only of the height of water in the filter above the filter-bed and the rate of flow of water from beneath the filter-bed, but also it will apprise him of the filtering condition of the material of the filter-bed itself. Relative variations in this condition for any given time will be clearly indicated on the record-sheet by differences in the relative location of the two record lines.

It may be desirable, however, to provide a more accurate indication of these differences of condition of positive head and negative head and filtering effectiveness of the filter-bed, hence one or other of the recording-arms 15 or 42 is provided with a graduated scale 47, and the other recording-arm with an indicating-finger 48, coöperating with said scale, the position of which finger with reference to the scale 47 will show instantly the relative conditions of head both above and below the filter-bed.

It may also be desirable at times to enable the inspector or observer to note these relative conditions from an inspection of the rear of the recording apparatus. To this end a properly graduated record-scale 49, Fig. 3, is provided, having indicating-lines which may register with the heights of the mercury columns in the gage-tubes 11 and 39, respectively. Thus the operator merely by glancing at this scale 49 may judge more or less accurately the condition of the filter, even though the observer stands at the rear of the recording-mechanism.

In addition to indicating the several different conditions above noted in a filter, namely, conditions of positive head and negative head in the filter, it is to be noted that the gage will also indicate a record time at which and the time during which the filter was being washed.

To this end the discharge pipe 3 beneath the filter bed is provided with a connection 50 which leads to any suitable source of water under pressure and said connection 50 also is provided with a valve 51 whereby when it is desired to wash or flush the filter bed, the valve 3ᵃ in the discharge pipe 3 may be closed and the valve 51 in the water connection 50 may be opened, thus admitting water under pressure to the filter beneath the filter bed and causing a thorough agitation and washing of the sand of the filter.

When this water under pressure is let in beneath the filter bed naturally pressure in the discharge pipe 3 and the gage connection 36 is increased. This considerable increase of pressure will be at once indicated and recorded by the indicator finger 43 on the chart 17, that is to say, the indicating finger 43 will rise considerably above the zero line of the chart and thereby clearly indicate and make a permanent record of the time and the head used in washing the filter.

While I have herein described a particular application of this recording mechanism, and have also specified particular constructions and arrangements of the parts, it is clear that the embodiment of the invention may be varied in these respects and to any desired extent within the scope of the appended claims.

What I claim is:

1. In a gage, the combination with a liquid container of a pipe, the lower end of which is submerged beneath the liquid in the container, and the upper end of which is provided with a vacuum chamber, a gage connection communicating with said pipe beneath said vacuum chamber, a float chamber, said gage connection communicating with said float chamber and a portion of said gage connection being filled with a liquid of greater specific gravity than that of the liquid whose head is to be measured, a float in said float chamber, a finger carried by said float, a record carrier, a stylus carried by said finger adapted to produce a recording line on said record carrier, whereby variations in the head of the liquid in said container may be indicated and the times at which and during which said variations took place may be recorded.

2. In a gage for gravity filters and the like, the combination with the filter chamber having a filter bed therein, of a pipe having its lower end submerged within the liquid above the filter bed, a recording gage connected with said pipe and comprising a float chamber, having a float therein and an indicating finger carried by said float, a recording surface, and means whereby said finger may produce a record on said surface, a discharge pipe for said filter chamber connected therewith below the filter bed, a gage pipe connected with said discharge pipe and having a recording mechanism connected therewith whereby variations of pressure within said discharge pipe may be permanently recorded.

3. In a gage mechanism, the combination with a filter chamber having a filter bed therein, of a discharge pipe connected with said chamber beneath the filter bed, a gage pipe connected with said discharge pipe, recording mechanism connected with said gage pipe whereby a record may be secured of variations of pressure within said filter discharge pipe, said gage mechanism being so constructed and arranged that said variations of pressure may be indicated and recorded during the normal operation of the filter, said discharge pipe having a wash connection whereby the material of the filter bed may be flushed or washed, said gage connection being so arranged with respect to the discharge pipe and its wash connection that variations in the pressure within the discharge pipe due to the washing operation may also be indicated and recorded on the recording mechanism.

4. In a gage mechanism, the combination with a filter chamber having a filter bed therein, of a gage pipe, the lower end of which is submerged beneath the surface of the water above the filter bed, recording means connected with said pipe whereby variations in the head of the liquid above the filter bed may be indicated and permanently recorded, a discharge pipe for said filter chamber connected therewith below the filter bed, a gage pipe connected with said discharge pipe, and recording means connected with said second gage pipe whereby variations in the pressure or head of liquid within said discharge pipe may be indicated and permanently recorded.

5. In a gage mechanism, the combination with a filter chamber having a filter bed therein, of a gage pipe, the lower end of which is submerged beneath the surface of the water above the filter bed, recording means connected with said gage pipe whereby variations in the head of the liquid above the filter bed may be indicated and permanently recorded, a discharge pipe for said filter chamber and connected therewith below the filter bed, a gage pipe connected with said discharge pipe, recording means connected with said second gage pipe whereby variations in the pressure or head of liquid within said discharge pipe may be indicated and permanently recorded, said discharge pipe also having a wash connection, said wash connection and the gage pipe for the discharge pipe being so relatively arranged that variations in pressure within the discharge pipe due to the washing operation may also be indicated and permanently recorded.

In testimony whereof, I, the said CHARLES A. HUMPHREYS, have hereunto set my hand.

CHARLES A. HUMPHREYS.

Witnesses:
JOHN F. WILL,
J. R. KELLER.